United States Patent
Hirose

(10) Patent No.: US 7,456,866 B2
(45) Date of Patent: Nov. 25, 2008

(54) CORRECTION OF BARYCENTERS OF SIGNALS OBTAINED BY ADDING AND READING CHARGES ACCUMULATED IN SOLID-STATE IMAGE SENSING DEVICE

(75) Inventor: Hisataka Hirose, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 889 days.

(21) Appl. No.: 10/691,153

(22) Filed: Oct. 21, 2003

(65) Prior Publication Data

US 2004/0080641 A1    Apr. 29, 2004

(30) Foreign Application Priority Data

Oct. 24, 2002    (JP)    ............... 2002-309898

(51) Int. Cl.
  H04N 5/228    (2006.01)
  H04N 5/225    (2006.01)
  H04N 3/14    (2006.01)
  H04N 5/335    (2006.01)

(52) U.S. Cl. ............ 348/222.1; 348/220.1; 348/273; 348/322

(58) Field of Classification Search .......... 348/222.1, 348/220.1, 273, 317, 322, 440.1; 382/254, 382/300
See application file for complete search history.

(56) References Cited

U.S. PATENT DOCUMENTS

| | | | | |
|---|---|---|---|---|
| 4,757,385 A * | 7/1988 | Hieda | ........... | 348/241 |
| 5,253,041 A * | 10/1993 | Wine et al. | ........... | 348/448 |
| 5,671,298 A * | 9/1997 | Markandey et al. | ........... | 382/298 |
| 5,847,758 A * | 12/1998 | Iizuka | ........... | 348/280 |
| 6,630,965 B1 * | 10/2003 | Xue et al. | ........... | 348/560 |
| 6,661,451 B1 * | 12/2003 | Kijima et al. | ........... | 348/220.1 |
| 6,686,960 B2 * | 2/2004 | Iizuka | ........... | 348/222.1 |
| 6,765,616 B1 * | 7/2004 | Nakano et al. | ........... | 348/273 |
| 6,791,713 B1 * | 9/2004 | Takahashi et al. | ........... | 382/299 |
| 7,145,598 B2 * | 12/2006 | Maeda | ........... | 348/222.1 |
| 2003/0020819 A1 * | 1/2003 | Fukuda | ........... | 348/246 |

FOREIGN PATENT DOCUMENTS

| | | |
|---|---|---|
| JP | 10-136244 | 5/1998 |
| JP | 11-103407 | 4/1999 |
| JP | 2000-078595 | 3/2000 |
| JP | 2000-253415 | 9/2000 |
| JP | 2001-086394 | 3/2001 |

(Continued)

*Primary Examiner*—Nhan T Tran
(74) *Attorney, Agent, or Firm*—Morgan & Finnegan, LLP

(57) ABSTRACT

A signal processing apparatus processes an image signal outputted from an image sensing device which has a plurality of photoelectric conversion elements covered with a color filter and which can be driven in a first reading method of separately reading signals from the respective photoelectric conversion elements and a second reading method of adding signals generated by the photoelectric conversion elements by at least two signals corresponding to the photoelectric conversion elements of a same color then outputting the added signals. The signal processing apparatus comprises a switch that switches between the first reading method and the second reading method, and a correction unit that passes signals inputted from the image sensing device without correcting positions of barycenters of the inputted signals when the first reading method is set, and corrects positions of barycenters of the inputted signals when the second reading method is set.

10 Claims, 4 Drawing Sheets

AFTER ADDING SIGNALS OF SAME COLOR    AFTER BARYCENTER CORRECTION

FOREIGN PATENT DOCUMENTS

| | | |
|---|---|---|
| JP | 2001-298748 | 10/2001 |
| JP | 2002-084547 | 3/2002 |
| JP | 2003-046876 | 2/2003 |
| JP | 2003-092764 | 3/2003 |
| JP | 2003-230054 | 8/2003 |
| JP | 2004-147093 | 5/2004 |
| JP | 2004-147094 | 5/2004 |

* cited by examiner

FIG. 2A — AFTER ADDING SIGNALS OF SAME COLOR

FIG. 2B — AFTER BARYCENTER CORRECTION

BAYER
ARRANGEMENT

AFTER ADDING SIGNALS
OF SAME COLOR

CORRECTION OF BARYCENTERS OF SIGNALS OBTAINED BY ADDING AND READING CHARGES ACCUMULATED IN SOLID-STATE IMAGE SENSING DEVICE

FIELD OF THE INVENTION

The present invention relates to a signal processing apparatus, an image sensing apparatus such as a video camera, and a control method of a signal processing apparatus and more specifically to, a signal processing apparatus, an image sensing apparatus, and a control method of a signal processing apparatus which processes an image signal outputted from a solid-state image sensing device selectively controllable in a mode of reading signals separately from respective pixels of an image sensing area, and a mode of adding and reading the signals by plurality of pixels.

BACKGROUND OF THE INVENTION

Conventionally, for an image sensing apparatus which combines and reads signal charges generated by respective photoelectric conversion elements, a method of driving image sensing elements so as to combine signal charges corresponding to the same color component in vertical transfer registers is considered (refer to Japanese Patent Application Laid-Open No. 2000-253415).

FIGS. 4A and 4B show a conceptual view of combining charges for the same colors in the vertical direction accumulated in image sensing elements covered with a Bayer filter. The Bayer filter has R, G, and B color filters arranged as shown in FIG. 4A. More specifically, lines in which R and G filters are alternately arranged, and lines in which G and B filters are alternately arranged are disposed alternately. When signal charges are combined in the vertical direction, since filters of each color are disposed on every other pixels, a driving unit of the image sensing elements drives the image sensing elements so that signal charges of the pixels arranged in every other lines are combined.

For example, referring to FIG. 4A, pixel signals from a line of $R_{00}$ and $G_{01}$ are combined with pixel signals from a line of $R_{20}$ and $G_{21}$, then pixel signals of a line of $R_{10}$ and $G_{11}$ shown in FIG. 4B are generated. Further, pixel signals from a line of $G_{10}$ and $B_{11}$ are combined with pixel signals from a line of $G_{30}$ and $B_{31}$, then pixel signals of a line of $G_{20}$ and $B_{21}$ are generated. Similarly, pixel signals from a line of $R_{40}$ and $G_{41}$ are combined with pixel signals from a line of $R_{60}$ and $G_{61}$, then pixel signals of a line of $R_{50}$ and $G_{51}$ are generated, and pixel signals from a line of $G_{50}$ and $B_{51}$ are combined with pixel signals from a line of $G_{70}$ and $B_{71}$, then pixel signals of a line of $G_{60}$ and $B_{61}$ are generated. The color order of the combined signals is the same as the Bayer order of the signals before combined.

When signals are combined in the aforesaid manner, the barycenter of each combined signal is located in the center of the two pixels before combined. This makes the barycenters of the combined signals approach each other by two lines as shown in FIG. 4B. Namely, the intervals between the barycenters are unequal in the vertical direction. Therefore, it is necessary to apply camera signal processing conforming to such arrangement to the combined signals. Whereas, when signal charges are separately read from the image sensing elements without being combined for, e.g., sensing a still image, camera signal processing conforming to the normal Bayer arrangement has to be performed. Thus, a camera signal processing unit conforming to a case of reading charge signals without combining them and a camera signal processing unit conforming to a case of combining and reading charge signals for sensing a moving image are needed.

SUMMARY OF THE INVENTION

The present invention has been made in consideration of the above situation, and has as its object to enable to perform the same camera signal processing both in a case of reading charge signals without combining them and in a case of combining and reading charge signals.

According to the present invention, the foregoing object is attained by providing a signal processing apparatus for processing an image signal outputted from an image sensing device which has a plurality of photoelectric conversion elements covered with a color filter and which can be driven in a first reading method of separately reading signals from the respective photoelectric conversion elements and a second reading method of adding signals generated by the photoelectric conversion elements by at least two signals corresponding to the photoelectric conversion elements of a same color then outputting the added signals, comprising: a switch that switches between the first reading method and the second reading method; and a correction unit that passes signals inputted from the image sensing device without correcting positions of barycenters of the inputted signals when the first reading method is set, and corrects positions of barycenters of the inputted signals when the second reading method is set.

According to the present invention, the foregoing object is also attained by providing an image sensing apparatus comprising: an image sensing device; a driving unit that drives the image sensing device; and the image processing apparatus having the configuration as described in the proceeding paragraph.

According to the present invention, the foregoing object is also attained by providing a signal processing method for processing an image signal outputted from an image sensing device which has a plurality of photoelectric conversion elements covered with a color filter and which can be driven in a first reading method of separately reading signals from the respective photoelectric conversion elements and a second reading method of adding signals generated by the photoelectric conversion elements by at least two signals corresponding to the photoelectric conversion elements of a same color then outputting the added signals, comprising: determining which of the first reading method and the second reading method is set; and correcting positions of barycenters of the signals inputted from the image sensing device when the second reading method is set.

In a preferred embodiment, in the correcting, the positions of barycenters of the inputted signals are corrected so that the intervals between the barycenters become equal in the vertical direction when the second reading method is set.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 1:
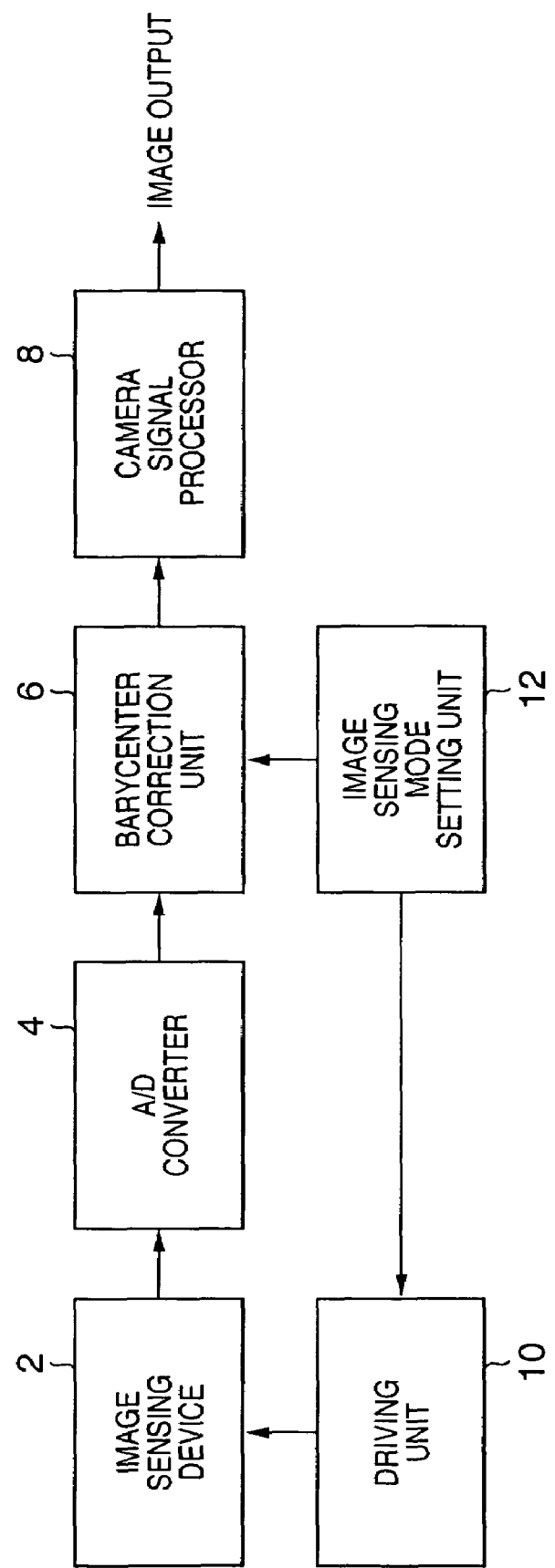
FIG. 1 is a block diagram illustrating a brief configuration of an image sensing apparatus according to an embodiment of the present invention.

FIG. 1 is a block diagram of an image sensing apparatus according to the embodiment of the present invention. In FIG. 1, reference numeral 2 denotes an image sensing device, of, inter alia, CCD or MOS type, for converting light flux which incidents on the image sensing device 2 into charge signals in correspondence with the amount of light; 4, an A/D converter for converting an analog signal outputted from the image sensing device 2 into a digital signal; 6, a barycenter correction unit for applying barycenter deviation correction (will be described later) to digital signals outputted from the A/D converter; 8, a camera signal processor for applying, inter alia, color separation, aperture process, δ correction to the digital signal outputted from the barycenter correction unit 6 and generating a luminance signal and color difference signals; 10, a driving unit for generating a timing signal for controlling the image sensing device 2; and 12, an image sensing mode setting unit for changing between a non-addition mode (still image sensing mode) of separately reading signal charges acquired by the image sensing device 2 without adding the signal charges, and an addition mode (moving image sensing mode) of reading signal charges from the image sensing device 2 after combining the signal charges of the same color.

Figures 4A, 4B:
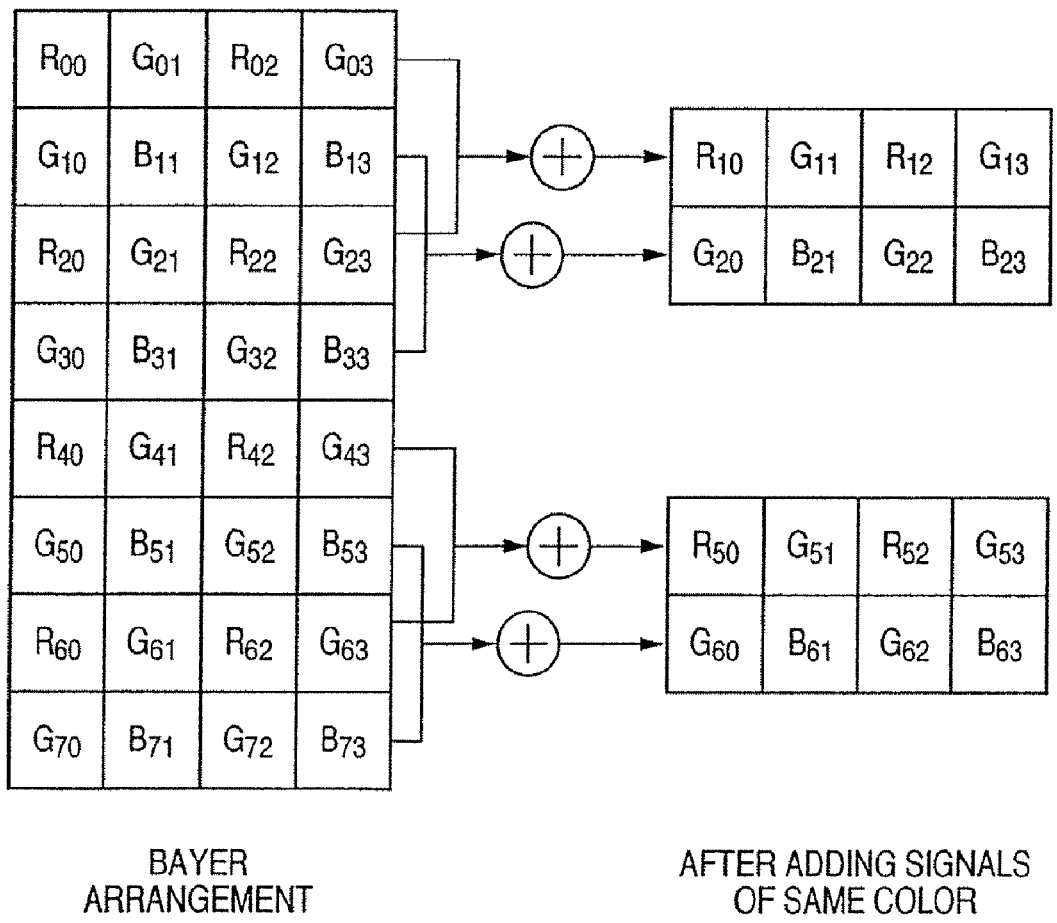
FIGS. 4A and 4B are conceptual views of combining pixel charges according to the prior art.

When the non-addition mode (still image sensing mode) is set by the image sensing mode setting unit 12, the driving unit 10 controls the image sensing device 2 so that signal charges are sequentially outputted without being combined, and when the addition mode is set, signal charges are read in such a manner as described in the background of the invention with reference to FIGS. 4A and 4B.

Figure 3:
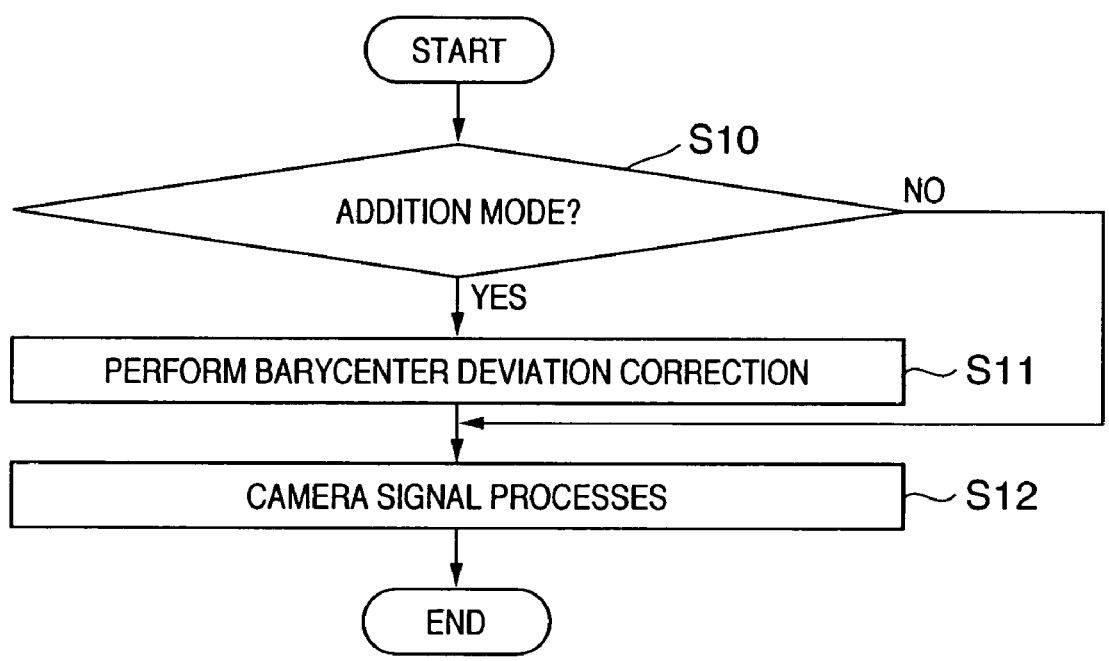
FIG. 3 is a flowchart of control processing according to the embodiment of the present invention.

Further, referring to FIG. 3, when the non-addition mode is set by the image sensing mode setting-unit 12 ("No" in step S10), the barycenter correction unit 6 does not perform the barycenter deviation correction and simply passes the digital signal inputted from the A/D converter 4 to the camera signal processor 8 without processing it (step S12). Whereas, if the addition mode is set ("Yes" in step S10), the barycenter correction unit 6 performs the barycenter deviation correction (step S11), and outputs the corrected signals to the camera signal processor 8 (step S12).

Therefore, in the non-addition mode, when the image sensing device 2 is covered with a Bayer filter as shown in FIG. 4A, the color order of read signal charges corresponds to the color arrangement of the filter, and the barycenter correction unit 6 simply passes the signals in the read order to the camera signal processor 8. Therefore, the camera signal processor 8 applies signal processes conforming to the image sensing device with the Bayer filter to the signals outputted from the barycenter correction unit 6, and outputs a luminance signal and color difference signals.

Whereas, in the addition mode (moving image sensing mode), signals corresponding to the same color are combined and read as described in the background of the invention with reference to FIGS. 4A and 4B.

The color arrangement of the combined signals is similar to the Bayer arrangement of the signals before combined. However, as described in the background of the invention, a barycenter of each added signal is located in the center of the two added pixel, and the intervals between the centers of the added signals are unequal in the vertical direction, i.e., lines of the added pixels approaches by two lines as shown in FIG. 4B.

Accordingly, the barycenter correction unit 6 processes the combined signals so that intervals between the barycenters of the combined signals become equal when the addition mode is selected by the image sensing mode setting unit 12.

Figure 2:
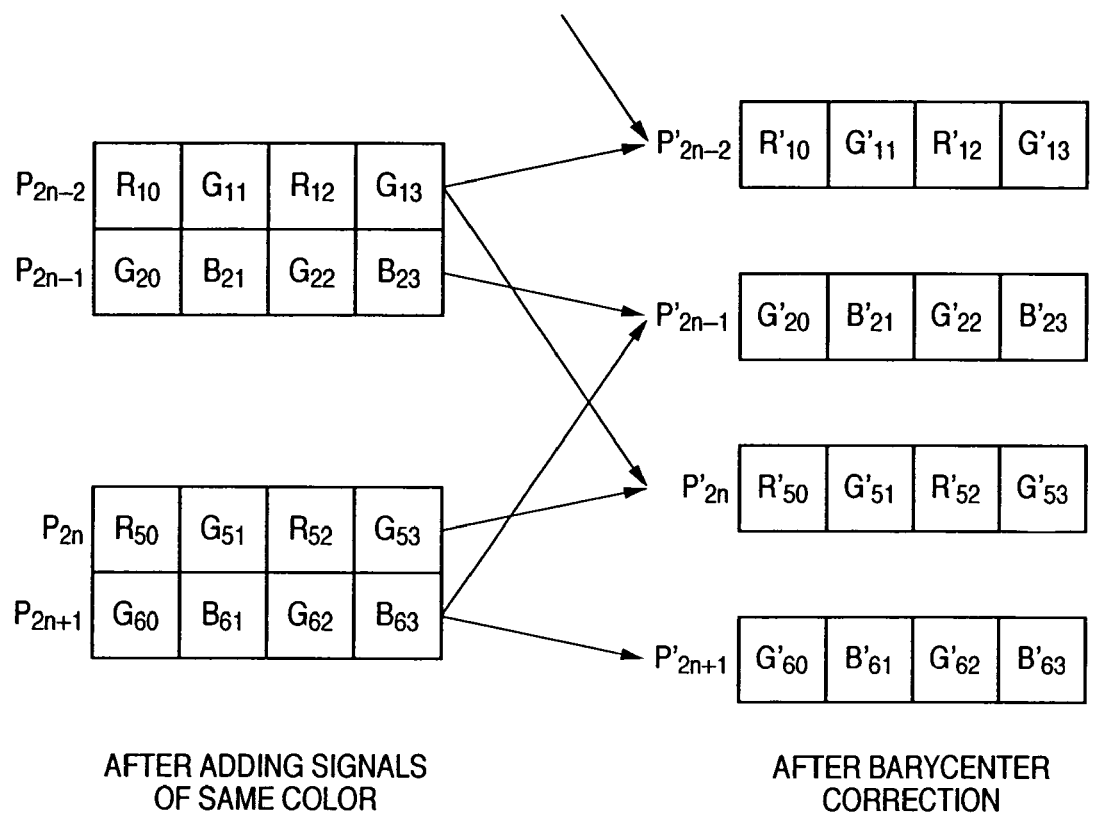
FIGS. 2A and 2B are explanatory views for explaining a correction operation for correcting deviation of barycenters according to the embodiment of the present invention.

FIGS. 2A and 2B are explanatory views for explaining barycenter deviation correction according to the embodiment. FIG. 2A shows combined signals of the same color pixels outputted from the A/D converter 4 when the signal addition is performed as described with reference to FIGS. 4A and 4B. Here, let $P_{2n}$ and $P_{2n-2}$ denote even number lines, and the even number lines be the upper lines of the approached two lines due to the barycenter deviation. Further, let $P_{2n+1}$ and $P_{2n-1}$ denote odd number lines, and the odd number lines be the lower lines of the approached two lines due to the barycenter deviation.

Further, let $P'_{2n}$ and $P'_{2n-2}$ denote even number lines after the barycenter deviation correction, and let $P'_{2n-1}$ and $P'_{2n+1}$ denote odd number lines after the barycenter deviation correction. n is a natural number.

As shown in FIG. 2A, since the ratios of the interval between the $P_{2n-2}$ and $P_{2n-1}$ and the interval between the $P_{2n]}$ and $P_{2n}$ are 1:3, the barycenter correction unit 6 of this embodiment performs correction using the following equations so as to make the interval between the lines equal as shown in FIG. 2B:

$$P'_{2n} = \tfrac{1}{8} \times P_{2n-2} + \tfrac{7}{8} \times P_{2n}$$

$$P'_{2n-1} = \tfrac{7}{8} \times P_{2n-1} + \tfrac{1}{8} \times P_{2n+1}$$

As for the signals in the even number lines, signals in a given line (e.g., signals of $P_{2n}$ line) and signals in a line two lines above the given line (e.g., signals of $P_{2n-2}$ line) are added with the weight of 7:1. Further, as for the signals in the odd number lines, signals in a given line (e.g., signals of $P_{2n-1}$ line) and signals in a line two lines below the given line (e.g., signals of $P_{2n+1}$ line) are weighted averaged with the weight ratio of 7:1.

In the color order of the signals after being combined as shown in FIG. 2A, since the signals of the same color are arranged every other pixel, the interpolated (corrected) signals expressed by the above equations are calculated using pairs of combined signals in every other lines.

FIG. 2B shows a concept of the signals obtained by the barycenter deviation correction as described above.

After the barycenter correction unit 6 performs the aforesaid processing, corrected combined signals whose barycenters now separate at a uniform interval in the vertical direction as shown in FIG. 2B are inputted to the camera signal processor 8 shown in FIG. 1. The combined pixel signals which have undergone the barycenter deviation correction can be treated equally to signal charges whose color order corresponds to the normal Bayer arrangement. Therefore, it is possible to obtain a luminance signal and color difference signals by applying the same camera signal processes performed in the non-addition mode to the corrected combined signals.

It should be noted that the barycenter deviation is corrected using $$P'_{2n} = 1/8 \times P_{2n-2} + 7/8 \times P_{2n}$$

$$P'_{2n-1} = 7/8 \times P_{2n-1} + 1/8 \times P_{2n+1}$$

However, the method of correcting the barycenter deviation is not limited to this, and it is possible to modify the present invention to use other barycenter deviation correction method.

Further, in the aforesaid explanation, a case of using a Bayer color filter of the primary colors is described. However, the present invention is not limited to this, and is applicable to a color filter of any color arrangement as far as, when the charges are read out in the addition mode, intervals between the barycenters of the combined signals are unequal in the vertical direction.

Further, a case of adding charges in two lines is explained; however, the present invention may be also applied to a case of adding charges in three or more lines.

Other Embodiment

The present invention can be applied to a system constituted by a plurality of devices (e.g., host computer, interface, camera head) or to an apparatus comprising a single device (e.g., digital still camera, digital video camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores the program codes corresponding to the flowchart of FIG. 3 and a correction operation corresponding to FIGS. 2A and 2B described in the embodiment.

The present invention is not limited to the above embodiments and various changes and modifications can be made within the spirit and scope of the present invention. Therefore to apprise the public of the scope of the present invention, the following claims are made.

What is claimed is:

1. A signal processing apparatus comprising:
    an image sensing device which has a plurality of photoelectric conversion elements covered with a color filter;
    a driver which drives said image sensing device in a first reading mode of separately reading signals from respective lines of photoelectric conversion elements and a second reading mode of reading all signals in one scan by adding signals generated by the lines of photoelectric conversion elements by at least two signals corresponding to the photoelectric conversion elements of a same color in every other line then outputting lines of the added signals, a color order of the added signals being the same as a color order of the signals before being added, in said second reading mode, a spatial distance between the barycenters of first and second lines, adjacent to each other, of the added signals being different from a spatial distance between barycenters of the second line and of a third line of the added signals that is adjacent to said second line;
    a switch that switches between the first reading mode and the second reading mode; and
    a correction unit that passes signals inputted from the image sensing device without correcting positions of barycenters of the inputted lines of signals when the first reading mode is set, and corrects positions of barycenters of the inputted lines of added signals so that the spatial distances between barycenters of the first to third lines becomes equal when the second reading mode is set.

2. The signal processing apparatus according to claim 1, further comprising a signal processing unit that applies camera signal processes suitable for signals whose color order is the same as that of the color filter to the signals outputted from said correction unit.

3. The signal processing apparatus according to claim 1, wherein said color filter has a Bayer arrangement of the three primary colors.

4. The signal processing apparatus according to claim 3, wherein, when letting signals in an even number line and signals in an odd number line subjected to the correction by said correction unit be $P_{2n}$ and $P_{2n-1}$ (n is a natural number), respectively, and letting corrected signals in an even number line be $P'_{2n}$ and corrected signals in an odd number line be $P'_{2n-1}$, said correction unit performs operations of:

$$P'_{2n} = 1/8 \times P_{2n-2} + 7/8 \times P_{2n} \text{ and}$$

$$P'_{2n-1} = 7/8 \times P_{2n-1} + 1/8 \times P_{2n+1}.$$

5. An image sensing apparatus comprising:
    an image sensing device;
    a driving unit that drives said image sensing device; and
    the image processing apparatus according to claim 1.

6. A signal processing method for processing an image signal outputted from an image sensing device which has a plurality of photoelectric conversion elements covered with a color filter and which can be driven in a first reading method of separately reading signals from respective lines of photoelectric conversion elements and a second reading method of reading all signals in one scan by adding signals generated by the lines of photoelectric conversion elements by at least two signals corresponding to the photoelectric conversion elements of a same color in every other line then outputting lines of the added signals, a color order of the added signals being the same as a color order of the signals before being added, in said second reading method, a spatial distance between barycenters of first and second lines, adjacent to each other, of the added signals being different from a spatial distance between the barycenters of the second line and of a third line of the added signals that is adjacent to said second line, comprising:

determining which of the first reading method and the second reading method is set; and correcting positions of the barycenters of the lines of signals inputted from the image sensing device so that the spatial distances between the barycenters of the first to third lines becomes equal when the second reading method is set.

7. The signal processing method according to claim 6, wherein said color filter has a Bayer arrangement of the three primary colors.

8. The signal processing method according to claim 7, wherein, when letting signals in an even number line and signals in an odd number line subjected to the correction by said correction unit be $P_{2n}$ and $P_{2n-}$ (n is a natural number), respectively, and letting corrected signals in an even number line be $P'_{2n}$ and corrected signals in an odd number line be $P'_{2n-1}$, operations of:

$$P'_{2n} = 1/8 \times P_{2n-2} + 7/8 \times P_{2n} \text{ and}$$

$$P'_{2n-1} = 7/8 \times P_{2n-1} + 1/8 \times P_{2n+1}$$

are performed in said correcting.

9. The signal processing method according to claim 6, further comprising applying camera signal processes suitable for signals whose color order is the same as that of the color filter to the signals outputted from said correction unit.

10. A storage medium, readable by an information processing apparatus, storing a program including program codes capable of realizing the signal processing method according to claim 6, the program being executable by the information processing apparatus.

* * * * *

UNITED STATES PATENT AND TRADEMARK OFFICE
CERTIFICATE OF CORRECTION

PATENT NO. : 7,456,866 B2  
APPLICATION NO. : 10/691153  
DATED : November 25, 2008  
INVENTOR(S) : Hisataka Hirose Page 1 of 1

It is certified that error appears in the above-identified patent and that said Letters Patent is hereby corrected as shown below:

Column 3, line 26, "δ correction" should read --γ correction--.

Column 8, claim 8, line 1, "$P_{2n\text{-}}$" should read --$P_{2n-1}$--.

Signed and Sealed this

Tenth Day of February, 2009

JOHN DOLL  
*Acting Director of the United States Patent and Trademark Office*